Figure 1:
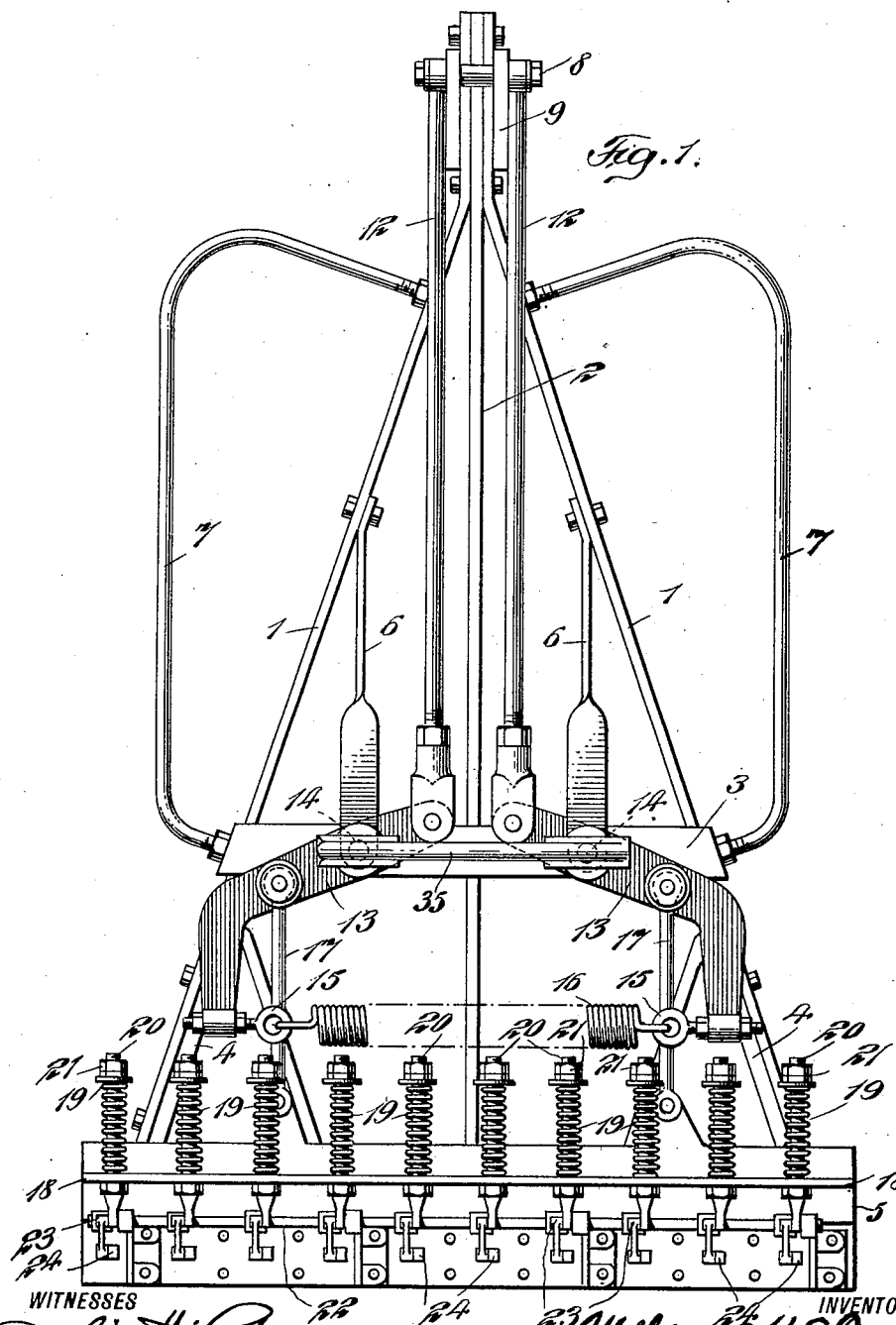

W. H. FRANCIS.
BRICK HANDLING MACHINE.
APPLICATION FILED OCT. 21, 1908. RENEWED DEC. 22, 1910.

999,774.

Patented Aug. 8, 1911.

3 SHEETS—SHEET 1.

WITNESSES

INVENTOR
William H. Francis,
BY
ATTORNEY

W. H. FRANCIS.
BRICK HANDLING MACHINE.
APPLICATION FILED OCT. 21, 1908. RENEWED DEC. 22, 1910.
999,774.
Patented Aug. 8, 1911.
3 SHEETS—SHEET 2.
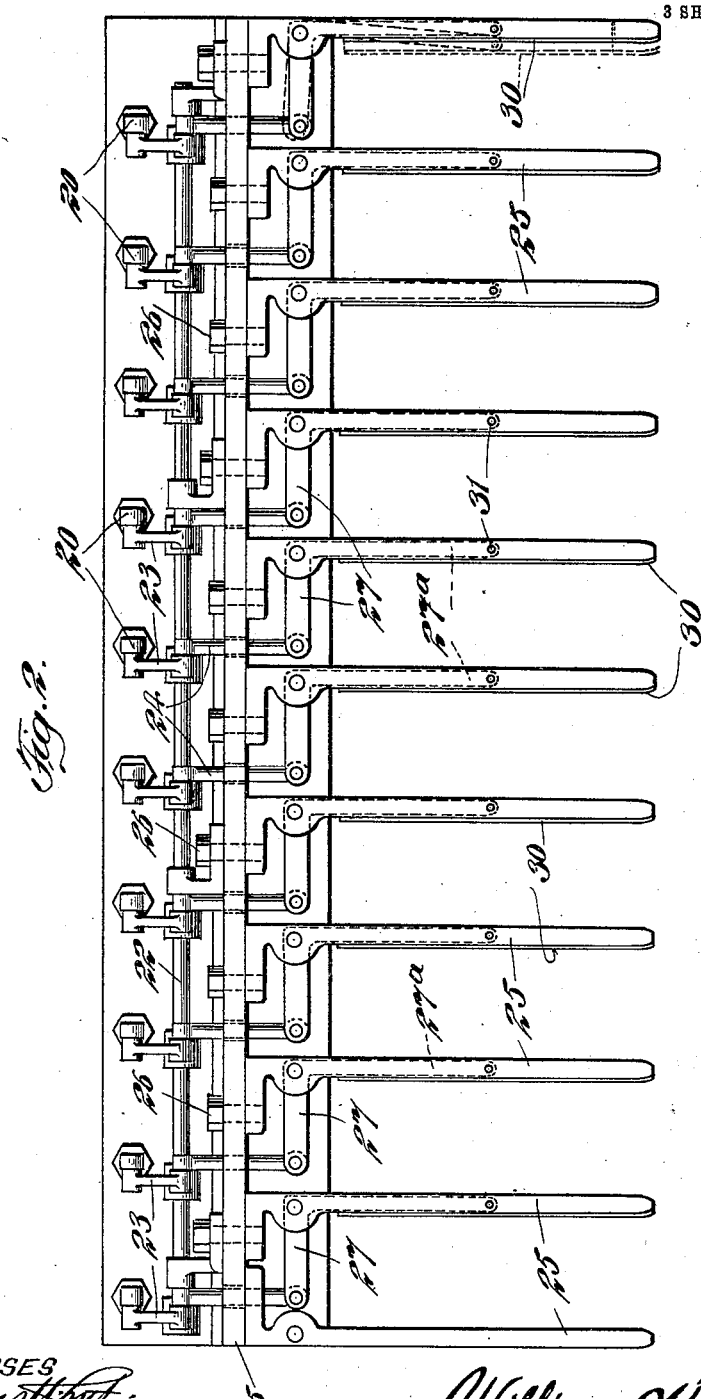

W. H. FRANCIS.
BRICK HANDLING MACHINE.
APPLICATION FILED OCT. 21, 1908. RENEWED DEC. 22, 1910.
999,774.
Patented Aug. 8, 1911.
3 SHEETS—SHEET 3.
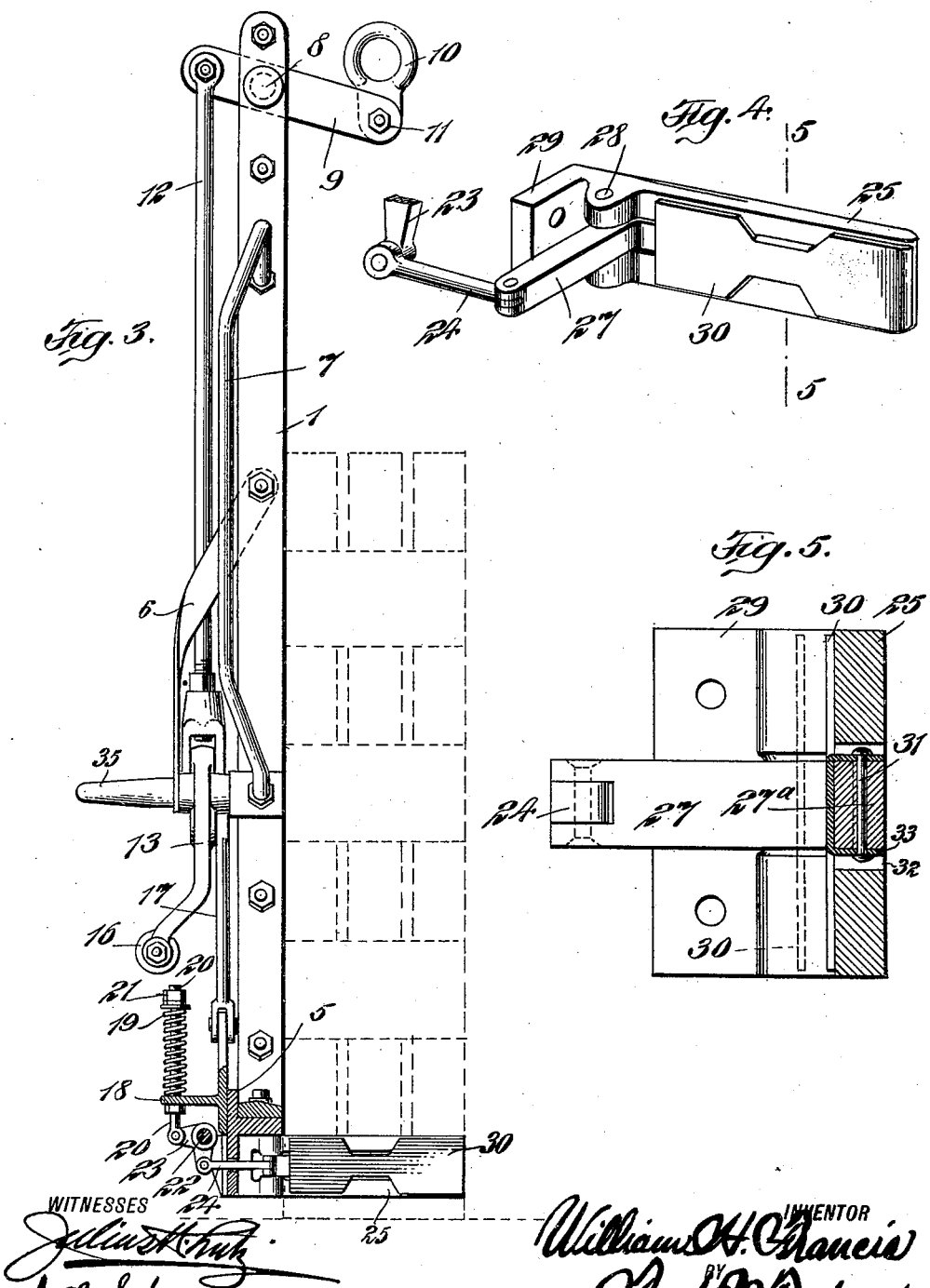

UNITED STATES PATENT OFFICE.

WILLIAM H. FRANCIS, OF CHERRYVALE, KANSAS.

BRICK-HANDLING MACHINE.

999,774. Specification of Letters Patent. Patented Aug. 8, 1911.

Application filed October 21, 1908, Serial No. 458,781. Renewed December 22, 1910. Serial No. 598,821.

*To all whom it may concern:*

Be it known that I, WILLIAM H. FRANCIS, a citizen of the United States of America, residing at Cherryvale, in the county of Montgomery and State of Kansas, have invented certain new and useful Improvements in Brick-Handling Machines, of which the following is a specification, reference being had therein to the accompanying drawing.

The present invention relates to a machine for handling bricks, said machine belonging to the general class wherein a lifting mechanism is employed for engaging at the base thereof a pile of bricks stacked up in accordance with a pre-arranged order. Examples of machines of this general class are seen in my former Letters Patent on brick handling machine, No. 859,445, dated July 9, 1907, and the Letters Patent granted to myself and Charles Francis for a brick handling machine, No. 859,586, dated June 9, 1908. The method which is performed by the mechanism in both of these patents, and which is itself covered in my former Letters Patent No. 874,582, dated December 24, 1907, relates to the handling of brick in bulk so that they may be transported to any other point without breaking the bulk. According to this method the bricks are stacked up with uniform spaces between the bricks of the basic layer so as to allow the lifting arms of the machine to enter these spaces to carry the superposed load, while the members of the basic layer are picked up and carried along with the superincumbent mass by means of the lateral gripping action of clamping devices arranged in connection with the lifting arms. When a load of bricks of this kind is transported and then set down again the basic layer rests upon the ground or floor and upholds the superincumbent mass without imprisoning the lifting arms and hence the latter can easily be withdrawn so as to be set free from the mass of bricks, and the gripping devices can also be set free, the original stacking thus being undisturbed by the transportation.

The present invention consists essentially in novel and ingenious devices for gripping or clamping the members of the basic layer of such a bulk or mass of bricks; and especially in gripping means which are automatically adjustable to irregularities in the surface and unevennesses in the thickness or other dimensions of the bricks, in order that the clamping may be tight and effective even though the bricks vary slightly in one or more of their dimensions, as they ordinarily do in the manufacture; and also the invention embraces numerous details and peculiarities in the construction, combination and arrangement of parts substantially as will be hereinafter described and claimed.

In the accompanying drawings illustrating my invention, Figure 1 is a front elevation of the entire machine. Fig. 2 is a bottom plan view of the bottom clamping mechanism with the vertical frame removed. Fig. 3 is a side elevation in partial section. Fig. 4 is a perspective view of one of the lifting arms and the movable clamping plate arranged in connection therewith. Fig. 5 is an enlarged cross sectional view on the line 5, 5 of Fig. 4, a part of the view being in elevation.

Similar characters of reference designate corresponding parts throughout the different figures of the drawings.

In Fig. 3 I have shown in dotted lines a stack of bricks with which my present improved brick handling machine is designed to operate. The bricks of the stack are piled so that the members of the basic layer are spaced apart a uniform distance, say, about one inch. Into the several spaces between the members of the basic layer project a series of lifting arms 25, which consists, if desired, of vertical plates having at the rear end an angular part 29 which is securely bolted by means of bolts 26 to the base bar 5 of the main frame of the machine. The series of projecting lifting arms 25 is clearly shown in Fig. 2, and the manner in which they are extended between the members of the basic layer so as to act under the superincumbent mass is fully indicated in Fig. 3.

The vertical main frame of the machine to which belongs the base bar 5 that carries the horizontal lifting arms 25 may be built in a great variety of ways, and I reserve the liberty of modifying the same within wide limits. The specimen thereof shown in the drawings and which is found to be useful and sufficient for the purpose comprises essentially two inclined bars 1, 1, a central vertical bar 2 to which the inclined bars are bolted near their upper ends, vertical straps 6, 6 which are bolted to the inclined bars 1, 1, a transverse and horizontal bar 3 which is bolted to the inclined bars 1, 1 at about midway of their height, and two triangular base frames 4 which are bolted to the inclined bars 1, and also to the base bar 5. Thus all these parts are rigidly bolted together to form a strong, complete, single, frame structure. Fastened to the side bars 1 are two upwardly extending handles or loops 7 used to manipulate the machine in moving it about. At the apex of the triangular frame thus constructed there is a short lever or pair of levers 9 pivoted upon a horizontal bolt 8 which passes through the upper end of the frame. This lever 9 is provided on its long end with an eye 10 pivoted thereto by means of a bolt 11, said eye 10 being for the purpose of receiving the lifting hook from a traveling crane. The other or short end of the lever 9 is pivoted to a vertical link 12, there being two of these which pass downwardly alongside of the main frame and are designed to operate as thrust bars. The lower ends of the links 12 are pivoted to the inner arms of two elbow levers 13, which are fulcrumed upon bolts 14 passing through the cross bar 3 and also the vertical straps 6 hereinabove alluded to. The lower members of the elbow levers 13 are provided with eye-bolts 15 to which are connected the opposite ends of a horizontal spiral tension spring 16. At a point between the fulcrum 14 of each one of the elbow levers 13 and its eye-bolt 15, there is pivotally connected a short vertical lifting rod 17. The two lifting rods 17 are bolted to a lift bar 18 and operate to lift the latter when the machine is in operation. The lifting strain on the bar 18 is applied to a series of coiled springs 19 which surround vertical stems 20 and bear at their upper ends against washers and nuts 21 on said stems 20. The stems 20 obviously pass downwardly through the bar 18. A handle bar 35 is attached to the front of the frame to assist in manipulating the machine.

The lower ends of the various stems 20 which project downwardly through the lift bar 18 are pivotally connected to the upper arms of small bell-crank levers 23 which are fulcrumed on a horizontal rod 22 supported in suitable bearings on the side of the base bar 5, and the downwardly projecting arms of these bell-crank levers 23 are pivotally connected to the ends of horizontal links 24 whose opposite ends are pivoted to right-angled levers 27 which are pivotally supported by means of pivot pins 28 on the sides of the series of lifting arms 25 (see Figs. 3 and 4). The elbow levers 27 have one arm $27^a$ running alongside the vertical face centrally of the lifting arm or plate 25 and working in an opening 32 therein, as indicated in Fig. 5. Alongside of each of the lifting plates 25 is a clamping plate 30 consisting of a thin piece of metal cut away centrally, and the cut away portions 33 above and below being secured to the arm $27^a$ by means of a pin 31. By rocking the elbow lever 27 on its pivot 28, the clamping plate 30 is moved bodily toward or away from the adjoining face of the lifting plate 25, or in other words, it is transferred from the position shown in full lines in Fig. 5 to that shown in dotted lines, and then back again to the position shown in full lines. When it is moved away from the lifting plate 25 to the position shown in dotted lines in Fig. 5, it is caused to clamp tightly against the adjacent brick and to cause said brick to be securely gripped between it and the vertical face of the relatively fixed lifting plate 25 on the other side of the brick. It is to be noted, furthermore, that inasmuch as the clamping plate 30 is pivotally supported at its middle point on the movable arm $27^a$ of the elbow lever, the two ends of such clamping plate 30 will be free to adjust themselves in correspondence with the surface of the brick with which said clamping plate is in contact.

While the pressure which actuates the clamping plate is applied thereto at its central point, where it is pivoted to the arm $27^a$, the clamping plate is carried laterally against the brick, and as the two ends are only actuated as the result of the carrying of the central portion of the clamping plate, it is quite obvious that any variation in the thickness of the brick between its ends or any irregularity in its surface, consisting of some slight protuberance or defective molding, will be compensated for by the facility with which the centrally-hung clamping plate will adjust itself when applied to the side of the brick. This action is of a yielding or elastic nature, and is found to be greatly superior to the use of a clamping plate which has no flexibility and which is carried rigidly its entire length against the side of the brick. In a case where the face of the movable clamping plate is absolutely parallel to the face of the coöperating lifting or clamping plate on the other side of the brick, and this parallelism is maintained at all times during the lateral clamping movement, there will be no possibility of adjustment so that the grip on a brick which varies slightly in thickness between its ends can be held with sufficient firmness to enable the machine to perform its proper function. It often happens that brick vary a trifle, being a little thicker at one end than at the other, or having some unevenness at some point, which would cause the brick to slip in case the clamp only gripped it tightly at a single point and not throughout its entire length; but with my yielding clamping plate which is self-regulative between its ends, so that it can apply its pressure centrally with firmness, and at the ends with the flexible action specified, I am enabled to provide that all the bricks whether regularly or unevenly molded shall be fixedly gripped and held so that the basic layer will not fail to have all its members lifted as a unit along with the superincumbent mass when the lifting plates 25 exert their lifting strain on said mass.

It will thus be seen that when the machine is applied to a stack of bricks whose basic layer is spaced apart, as I have already hereinabove indicated, the series of laterally extended vertical bars or plates 25 which act as lifting fingers will be inserted between the bricks of the basic layer and will be in contact with the bricks above the basic layer so that when the apparatus is lifted the superposed weight of the bricks above will be lifted; and also that simultaneously with the lifting of the weight of the superincumbent mass by means of the laterally extended plates 25 the clamping plates 30 will be expanded against the adjacent bricks of the basic layer, clamping said bricks in the manner already specified, so that in this way the bricks of the basic layer are pinched and held sufficiently tight to maintain the unity of this basic layer and to allow it to be lifted simultaneously with the superposed bricks. Hence the whole bulk, including the basic layer, is transported intact. The initial lifting movement is thus transmitted through the stems 20 to the bell-crank levers 23, links 24 and the elbow levers 27 to the laterally-movable clamping plates 30. When the apparatus is lifted, the inner ends of the elbow levers 13 are thrown down by the thrust links 12, thereby spreading the spring 16 which acts as a balancing device, and pulling upwardly the lifting rods 17 which lift the bar 18 and compress the several springs 19, thus yieldingly imparting lifting movement to the several stems 20. Thus the coiled springs 19, interposed as they are in the movement of the train of levers, exercise an important function in that they provide an elastic action for each clamping plate 30 and permit every clamping plate to expand to the full size of the space existing between the bricks of the basic layer, independently of every other device of the kind in the series, and at the same time inasmuch as the clamping plate 30 is centrally hung, as previously explained, a compensatory mechanism is provided for the unevennesses and inequalities of the thickness of the bricks. Hence I insure that all the bricks of the basic layer shall be uniformly clamped and held so that the integrity of the basic layer as a unit may be maintained in the lifting process.

Many changes and variations in the exact construction and arrangement of the various parts may be made without exceeding the legitimate scope of my invention, and I reserve the liberty of modifying the same as may be found necessary in practice.

Having thus described my invention, what I claim as new and desire to secure by Letters Patent, is:

1. A machine for handling bricks, comprising a main frame, projecting arms thereon, clamps movable independently of and substantially parallel to said arms, and means for automatically varying the clamping action of the said clamps at their ends.

2. A machine for handling bricks, comprising a main frame, projecting arms thereon, clamps movable independently of and substantially parallel to said arms, and means for automatically varying the clamping action of the said clamps at their ends, said means including a support pivoted to the clamps between their ends.

3. A machine for handling bricks, comprising a main frame, lifting arms thereon, clamps movable with respect to said arms, a support for each of said clamps pivoted thereto at a single point, and means for actuating said support for the purpose of causing the clamps to exert their clamping effect.

4. A machine for handling bricks, comprising a main frame, lifting arms thereon, clamps having a bodily movement with respect to said arms, pivotal supports for each of said clamps, actuating mechanism for the clamps, and elastic devices to compensate for variations in the spaces between the bricks.

5. A machine for handling bricks, comprising a main frame, projecting arms on the lower end of said frame, clamps movable independent of and substantially parallel to said arms so as to have a bodily movement with respect to said arms, means for supporting each clamp pivotally at a point between its ends so that the said ends may be automatically variable in their clamping action, mechanism for actuating the clamps, and individual elastic devices interposed in said mechanism to compensate for variations in the spaces between the bricks.

6. A machine for handling bricks, comprising a main frame, lifting arms thereon, clamps alongside of said arms and independent thereof, and means supporting said clamps so that they may be movable with respect to said arms and may automatically vary the clamping action at the ends to compensate for inequalities in the bricks.

7. A machine for handling bricks, comprising a main frame, lifting arms thereon, clamps movable independently of and substantially parallel to said arms, and supporting and actuating means pivotally applied at a single point to said clamps.

8. A machine for handling bricks, comprising a frame and a plurality of pairs of clamping members, one member of each pair being hung pivotally alongside of and independent of its companion, and means for spreading them apart during the clamping action and causing them to apply their ends differentially to compensate for inequalities in the bricks.

9. A machine for handling bricks, comprising a frame and a plurality of pairs of clamping members, one member of each pair being hung pivotally alongside of and independent of its companion, and means for spreading them apart during the clamping action and causing them to apply their ends differentially to compensate for inequalities in the bricks, said means including elastic devices to compensate for variations in the spaces between the bricks.

10. A machine for handling bricks, comprising a frame, a plurality of lifting arms at the lower end adapted to be inserted between adjacent bricks of a stack, and clamps laterally movable with respect to said arms, said clamps being pivotally supported at a single point between their ends, mechanism for actuating the clamps, and individual yielding devices interposed in said mechanism to compensate for variations in the spaces between the bricks.

11. A machine for handling bricks, comprising a frame, a plurality of pairs of members adapted to be inserted between adjacent bricks of a stack, means for pivotally supporting one member of each pair between its ends and spreading it relatively to the other, and a spring mechanism for compensating for variations in the spaces between the bricks.

12. A machine for handling bricks, comprising a frame having a plurality of pairs of members adapted to be inserted between adjacent bricks of a stack, means for pivotally supporting one member of each pair at a point between its ends so that the ends of the member may be free to adjust themselves to the brick while the member itself is bodily movable independently of and substantially parallel to its companion, and means for operating said spreading member when the lifting strain is applied to the machine.

13. A machine for handling bricks, consisting of a frame, a plurality of pairs of members adapted to be inserted between adjacent bricks of a stack, one of said members of each pair having a lateral clamping movement substantially parallel to its companion and a secondary transverse movement, means for supporting said clamping members so that they may perform both movements as required, whereby the bricks may be clamped and inequalities compensated for.

14. A machine for handling bricks, consisting of a vertical frame, a series of laterally extended arms thereon adapted to be inserted between the adjacent bricks of a stack, a movable clamp alongside of each arm, said clamp being pivoted at the center, and means whereby the lifting strain on the machine is applied to the pivotal point on each clamp to move the latter.

15. A machine for handling bricks, consisting of a vertically disposed frame, laterally projected pairs of members carried by the lower end of said frame, one member of each pair being pivotally hung between its ends so that the latter may be free to adjust themselves, and means for moving said pivoted members relatively to the others.

16. In a machine for handling brick, the combination of a vertically disposed frame, laterally extended lifting arms carried by the lower end of said frame, expansible clamping plates alongside said laterally extended arms, elbow levers pivoted to said clamping plates at points between the ends of the latter, and mechanism for actuating said elbow levers, individual elastic devices being interposed in said mechanism to compensate for variations in the spaces between the bricks.

17. In a machine for handling bricks, the combination of a vertically disposed frame, laterally extended lifting arms carried by the lower end of said frame, clamping plates alongside said arms, levers pivoted to said clamping plates at points between their ends, and means for actuating said levers for the purpose of causing the clamping plates to act against the bricks.

18. In a machine for handling bricks, the combination of a vertically-disposed frame having a lever device at the top and below it near the bottom a series of lifting bars, clamping plates arranged in connection with said bars, means for supporting said plates at a single point, and intermediate mechanism between said clamp-supporting means and the lever at the top of the frame whereby the initial lifting movement on the frame results in the application of the clamps to the bricks.

In testimony whereof I affix my signature in presence of two witnesses.

WILLIAM H. FRANCIS.

Witnesses:
  D. H. HICKS,
  W. L. BUCKLES.

---

Copies of this patent may be obtained for five cents each, by addressing the "Commissioner of Patents, Washington, D. C."